ary Examiner—Daryl W. Cook
Assistant Examiner—Robert M. Kilgore
Attorney, Agent, or Firm—Elliott I. Pollock

United States Patent [19]
Constable

[11] 3,892,948
[45] July 1, 1975

[54] ACCESS- OR TRANSACTION-CONTROL EQUIPMENT
[75] Inventor: Geoffrey Ernest Patrick Constable, Berkhamsted, England
[73] Assignee: Smiths Industries Limited, London, England
[22] Filed: Feb. 26, 1973
[21] Appl. No.: 336,126

[30] Foreign Application Priority Data
Feb. 28, 1972 United Kingdom............... 9145/72

[52] U.S. Cl............. 340/149 R; 235/61.7 B; 221/2
[51] Int. Cl........ H04q 5/02; G07f 7/00; G06k 5/00
[58] Field of Search...235/61.11 E, 61.11 D, 61.7 B, 235/61.11 R; 340/149 A, 149 R; 194/4; 221/2; 177/314

[56] References Cited
UNITED STATES PATENTS

| | | | |
|---|---|---|---|
| 2,517,619 | 8/1950 | Ainley................. | 177/314 |
| 3,039,582 | 6/1962 | Simjian................ | 194/4 |
| 3,401,830 | 9/1968 | Mathews.............. | 221/2 |
| 3,513,298 | 5/1970 | Riddle................. | 235/61.11 D |
| 3,513,441 | 5/1970 | Schwend............. | 340/149 A |
| 3,657,521 | 4/1972 | Constable........... | 235/61.7 B |
| 3,665,162 | 5/1972 | Yamamoto.......... | 235/61.7 B |

FOREIGN PATENTS OR APPLICATIONS

| | | | |
|---|---|---|---|
| 1,246,125 | 9/1971 | United Kingdom........... | 235/61.7 B |

Primary Examiner—Daryl W. Cook
Assistant Examiner—Robert M. Kilgore
Attorney, Agent, or Firm—Elliott I. Pollock

[57] ABSTRACT

A money-dispensing system is operative to dispense money to a bank customer in response to keyed-entry of his personal-identification number and account number in succession, using a set of ten push-buttons. The account number is printed out and as read from the hard-copy log is transmitted to a central processor to obtain read out of account information stored there. The stored account information includes a check number for comparison with the entered personal-identification number which is transmitted via the data link in enciphered form. Provided there is correspondence of the enciphered personal-identification number with the check number and the transaction is not otherwise barred, approval for dispensing of the money to the customer is signalled to the terminal station by transmission over the data link of an enciphered number specially generated at the processor using a cipher supplied from the terminal station. The same number is generated independently at the terminal station using the same cipher and is compared for equality with the number received over the data link in recognizing this as signifying approval of the dispensing operation.

3 Claims, 3 Drawing Figures

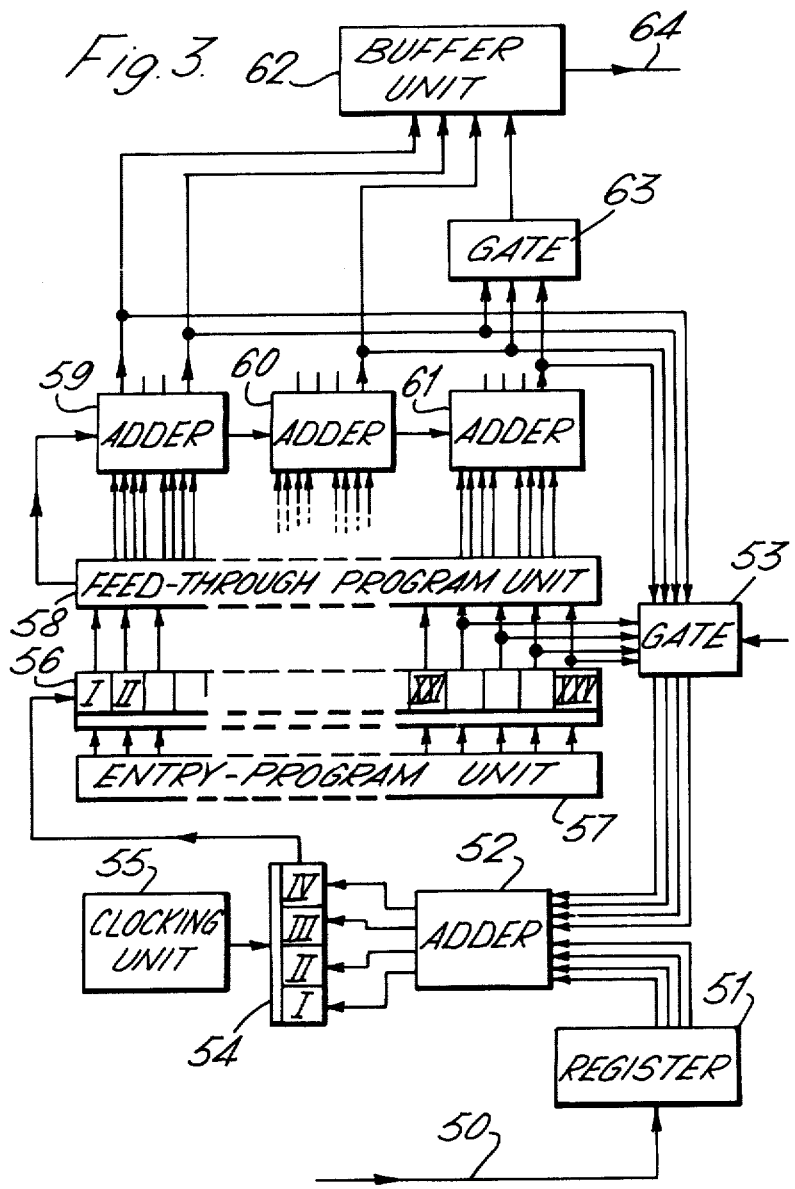

ACCESS- OR TRANSACTION-CONTROL EQUIPMENT

The present invention relates to access- or transaction-control equipment.

Access- or transaction-control equipment for use in dispensing money to authorized customers of a bank is described in U.S. Pat. Nos. 3,611,293 and 3,641,497 which issued Oct. 5, 1971, and Feb. 8, 1972, respectively, and which are both assigned to Smiths Industries Limited, and also in U.S. Pat. No. 3,629,834 which issued Dec. 21, 1971, and which is assigned to Smiths Industries Limited and Chubb & Son's Lock and Safe Company Limited. With this money-dispensing system each customer authorized to use the system is issued with a credit card that is embossed with the customer's account information. The customer is separately informed of a secret personal-identification number individual to his account, and when he wishes to withdraw money he merely presents the credit card to a terminal station of the system and keys in his personal-identification number. A printed record of the presented card, required for accounting purposes, is made within the terminal station and authorization of the requested transaction is then sought from the bank's central computer. Authorization is given from the computer, so that dispensing can then take place to the customer at the terminal, only if there is accord between the number keyed in and the customer's account number embossed on the card.

The credit card and its authenticity have an essential role in the construction and operation of the earlier money-dispensing system, and it is one object of the present invention to enable use of a credit card as an essential, to be avoided.

According to the present invention equipment for use in the authorization of an operation enabling access to a facility and, or alternatively, affording credit to a customer in a transaction, comprises means operable manually by the person seeking said authorization to enter into the equipment two sets of information, the information entered being in each case dependent on the manual operation effected to the manually-operable means, means for effecting a comparison between the two sets of information to detect whether a predetermined correspondence exists between them, and means for signifying authorization of said operation in dependence upon the detected existence of said predetermined correspondence.

The comparison may be made between the two sets of information directly, or alternatively, only after one (or both) has been translated into a different form. Furthermore the detection of whether the predetermined correspondence exists in the comparison may be based on the existence or otherwise of a stored association between the two sets of information, within in the equipment; alternatively, it may be based solely on the existence or otherwise of a relationship between them after one (or both) has been submitted to a translation process.

The equipment of the present invention may be used for credit-checking purposes at a point-of-sale, authorization for a requested credit transaction being signified in dependence upon the existence of the requisite correspondence between the two sets of entered information. In this respect the equipment may involve on-line connection from the point-of-sale to a central credit-checking processor at which the comparison for correspondence takes place and from which authorization of the requested transaction is signalled to the point-of-sale. The equipment may also, or alternatively, be used to control access to any form of facility, for example, entry to a restricted area, and may be used to control access to use of a service or release of means enabling withdrawal of an item or product in predetermined or selected quantity. In the latter respect and according to a feature of the present invention, a dispensing system comprises manually-operable devices for entering a number or other word into the system, the particular word entered being dependent on which, and in what sequence, the said manually-operable devices are operated, means to derive signals in accordance with the two words entered by successive sequences of operation of said manually-operable devices, means for effecting a comparison between the two words to detect whether a predetermined correspondence exists between them, dispenser means that is selectively operable to effect a dispensing operation, and means for operating the dispenser means to effect the dispensing operation in dependence upon the detection of the existence of said predetermined correspondence between the two words.

A money-dispensing system in accordance with the present invention will now be described, by way of example, with reference to the accompanying drawings, in which:-

FIG. 3 is a schematic representation of a form of enciphering unit used in the money-dispensing system.

Figure 1:
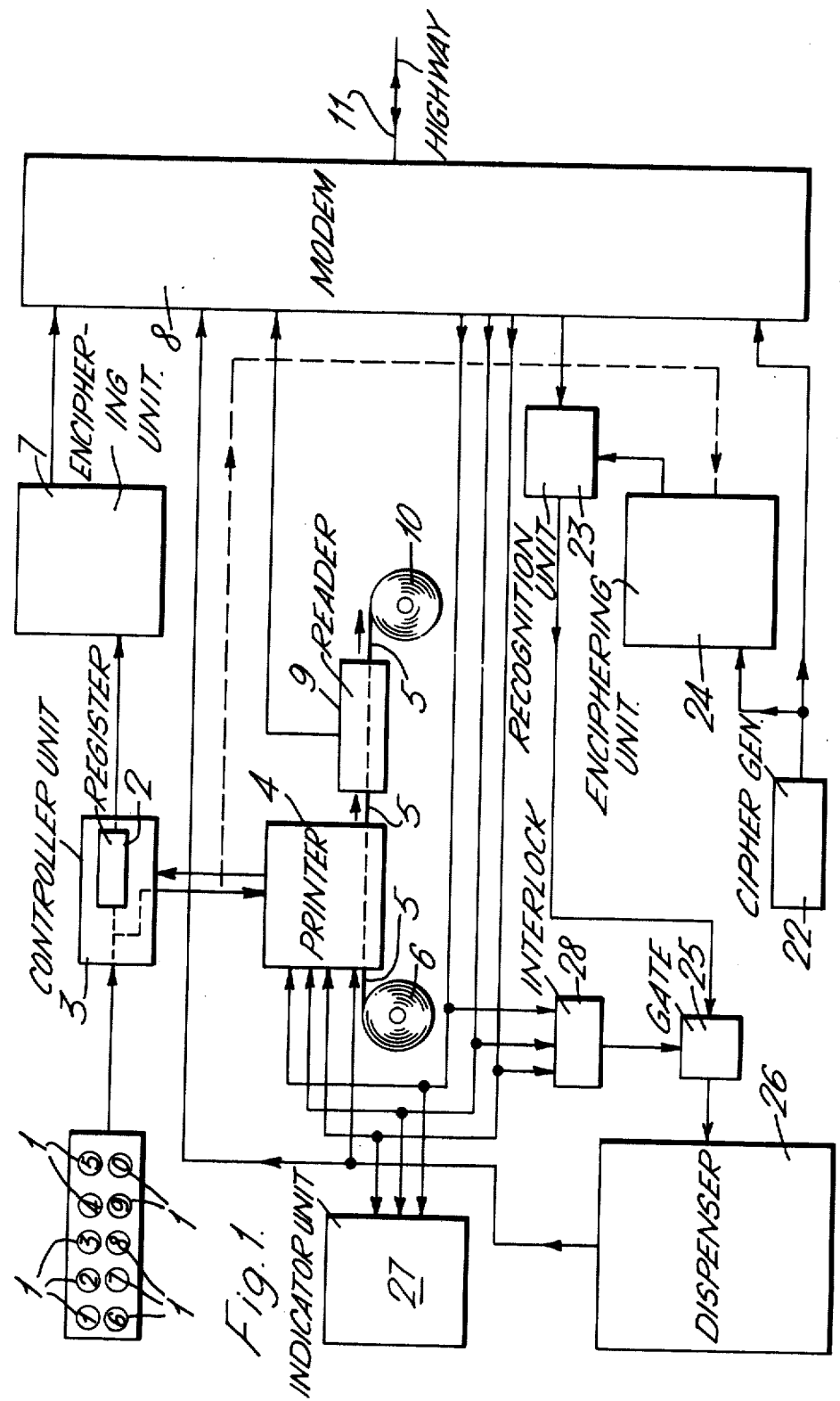
FIG. 1 is a block schematic representation of a money-dispensing terminal of the system.

The system to be described is for use in dispensing packets of bank-notes, one at a time, to customers of a bank, and is for use after, as well as during, normal banking hours. Each customer authorized to use the system is informed of a secret, personal-identification number of six digits, that is individual to him, and also of a maximum permissible frequency (for example, once in any day) with which he may make use of the system to withdraw money. The personal-identification number alloted to the customer is additional to the identification number allotted to his account with the bank, and is not related in any deducible way to it. Secrecy of the personal-identification number is of prime importance to the security of the system, and in order that it shall more readily remain secret the customer may be advised of it (and in fact always retain and use it) in the form of, for example, two three-digit numbers.

When the customer wishes to withdraw a packet of bank-notes, he simply goes to a money-dispensing unit of any one of a number of money-dispensing terminals of the system. The money-dispensing terminals are located at the various branches of the bank and in this respect may be spaced by considerable distances from one another; terminals may also be installed at railway stations, airports and other public places. Each money-dispensing unit is provided with a set of 10 push-buttons numbered from 0 to 9 and the customer operates these to enter his personal-identification number and his account number in turn. The system records the entered account-number for accounting and auditing purposes, and after confirming the validity of the transaction dispenses to the customer one packet of bank-notes.

Confirmation of validity of the transaction is obtained from three checking procedures that are carried out at a central computer-station of the system. In a first of these procedures a check is made to confirm that the personal-identification number entered by the customer is that associated with the account identified by the entered account-number, that is to say, to confirm that the two numbers entered by the customer have an appropriate and predetermined unique relationship to one another. The other two procedures serve to check that the customer's maximum, permissible frequency of use will not be exceeded by the transaction, and that the customer's account is credit worthy and not otherwise barred from use.

The computer station is common to all the money-dispensing terminals and communication between the station and the various terminals in the system is made via a conventional data link, for example, via a telephone or telegraph line. Information relating to the account of each bank customer authorized to use the system, is stored at the computer station, such information being stored under the numbering system of the accounts. Although the computer station of the system may be the central computer installation of the bank, storing all details of all customer's accounts, this is not necessary, and in the system to be described the computer station is a comparatively small installation that operates as a satellite to the central computer. In this respect the information stored at the computer station in respect of each customer's account is confined to a check number corresponding to the personal-identification number alloted to the customer, and a number, the 'use' number, representative of the extent to which the customer has used or may still use the system within the maximum permissible frequency of use notified to him. The computer station also stores the numbers of accounts that are no longer credit worthy or are otherwise barred from use. The stored information is brought up to date by periodic data transfer between the station and the main computer. This can be achieved simply by replacing magnetic tapes or discs used for information storage at the station, by corresponding tapes or discs that have been up-dated from the main computer.

The information recorded at the computer station concerning the extent to which the customer has used, or may still use, the system within his maximum permissible frequency of use, provides a check on the amount by which his account is to be debited. However the principal accounting record of each transition is provided in hard-copy form within the terminal at which the customer's request for money is made and met.

The construction of a typical money-dispensing terminal of the system is shown in FIG. 1, and this together with its operation in response to a request for money, will now be described.

Referring to FIG. 1, the set of ten push-buttons 1 at the terminal are mounted to be readily available for operation by the bank-customer, and in this respect may be mounted, for example, in the outer wall of bank premises so as to be available to the customer from the street. As the push-buttons 1 are operated one at a time to enter the six digits of the customer's personal-identification number in turn, signal-representations of these digits are conveyed in a four-digit binary-coded demical form to a register 2 of an electronic-controller unit 3. Reception of the six-digit personal-identification number in the register 2 prepares the unit 3 to receive signal-representations of the customer's account number.

The customer's account number is signalled to the unit 3 by operation of the push-buttons 1 one at a time in exactly the same manner as for the signalling of the personal-identification number. The signal-representations of the binary-coded decimal digits in this case, however, are supplied through the control unit 3 to a printer 4. The printer 4 prints out the individually-signalled account-number digits in both decimal characters and a two-out-of-five decimal bar-code, on a paper tape 5 that is fed from a supply spool 6. Print out of the full account number on the tape 5 by the printer 4 provides a control signal that serves to operate the unit 3 to read out the personal-identification number stored in the register 2 into an enciphering unit 7. In the event that this control signal is not received by the unit 3 within a fixed period (for example of fifteen seconds) following entry of the personal-identification number, the register 2 is cleared without read out into the unit 7, so that the equipment is then thereby automatically returned to its initial condition.

The enciphering unit 7 acts according to an involved and secret program to convert the personal-identification number read out from the register 2 to an enciphered form which has no readily deducible correspondence with the personal-identification number entered by the customer. The enciphered number, which is uniquely related to the personal-identification number and also thereby to the customer's account number, is in a four-digit binary-coded form, and signals in accordance with this are supplied together with correspondingly-encoded signals of the customer's account number, to a modulator-and-demodulator unit or modem 8. The signals representative of the customer's account number are derived by a photoelectric reader 9 that reads out the number printed in bar code on the tape 5 as this is drawn on from the printer 4 towards a storage reel 10.

The modem 8 is connected to a data highway 11 and transmits the binary-coded representations of the customer's account number and enciphered personal-identification number over this highway 11 to the computer station as well as a number identifying the terminal involved. The highway 11 provides the data link interconnecting the various terminals of the system with the computer, and it is over this that all communication between terminal and computer station takes place.

Figure 2:
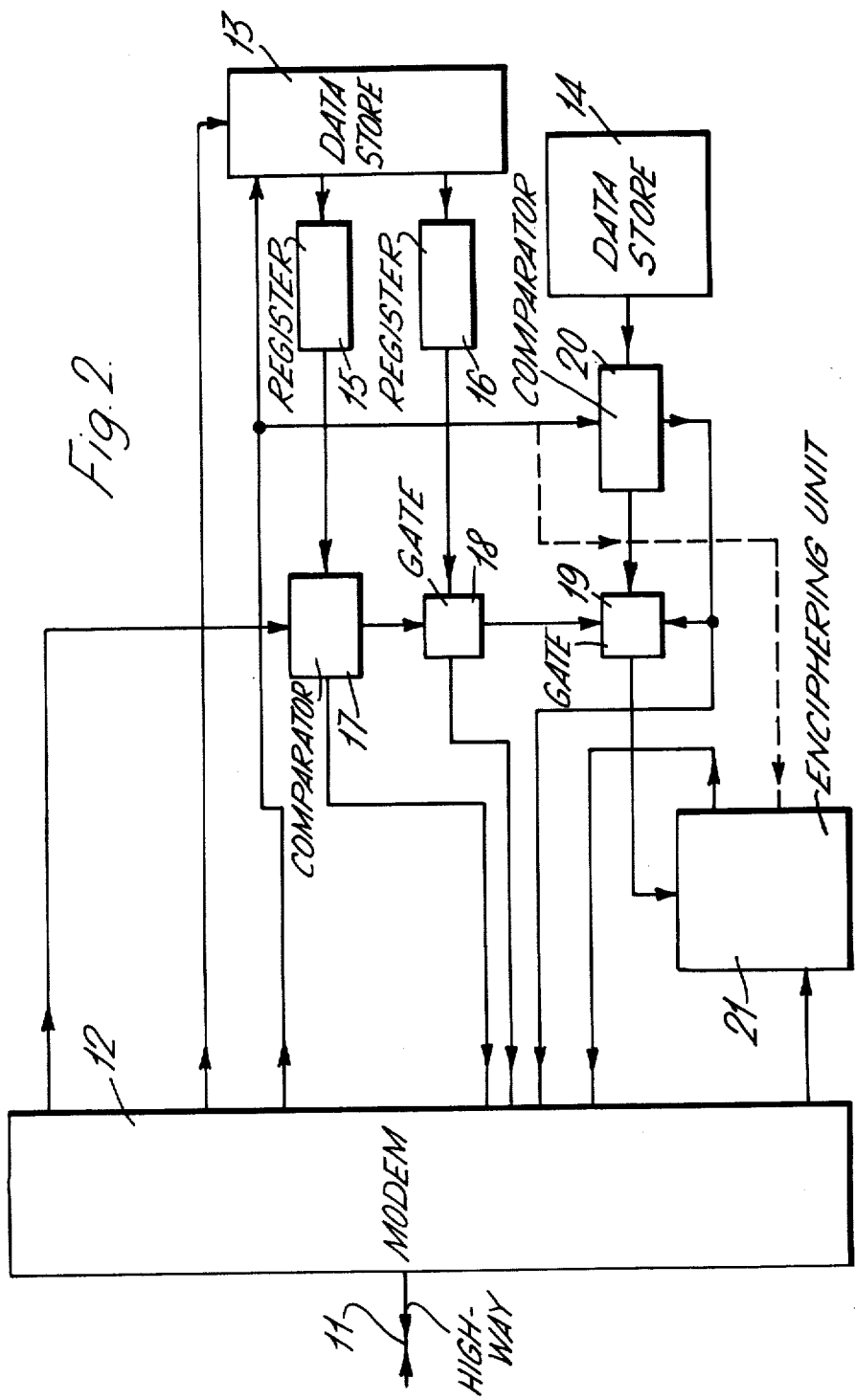
FIG. 2 is a block schematic representation of a central computer-station of the system.

The computer station is illustrated in FIG. 2 and, referring to this figure, includes a modem 12 that is connected to the highway 11 and to two data-storage units 13 and 14 of the station. The unit 13 includes a random-access memory that stores the various authorized-customers' account-information, and is addressed by the customer's account number as received (in the present case under consideration, from the modem 8 of FIG. 1) by the modem 12. This addressing of the memory in the unit 13 causes the two items of information stored at the station in respect of the identified account, namely the check number corresponding to the relevant customer's personal-identification number, and his use number, to be read out into registers 15 and 16 respectively.

The check number in the register 15 is compared for correspondence with the enciphered personal-identification number received with the customer's account number by the modem 12. The comparison is made by a comparator 17, and in this respect the check number stored in relation to each account is either the same as, or has some other fixed relationship (for example that of tens' or nines' complement) to, the enciphered form of the relevant customer's personal-identification number. If the comparator 17 detects the appropriate correspondence between the number in the register 15 and the enciphered number received from the modem 12, it supplies a signal to this effect to a gating unit 18. The gating unit 18 is responsive to the use-number content of the register 16 to pass the signal supplied by the comparator 17 on to a further gating unit 19 only if the requested transaction can go ahead without causing the customer's permitted frequency of use of the system to be exceeded. The gating unit 19 is responsive to a comparison that is effected by a comparator 20 between the customer's account number as received by the modem 12 and the contents of the storage unit 14.

The storage unit 14 includes a memory that stores a listing of the account numbers of all customers that are no longer credit worthy or who are otherwise to be barred from use of the system. The comparator 20 checks the account number received by the modem 12 against the listed numbers in turn. If the signalled account-number is detected in the listing then a signal to this effect supplied by the comparator 20 inhibits operation of the gating unit 19 so that passage of the signal from the gating unit 18 to a signal-enciphering unit 21 is blocked. However, in the event that the customer is not to be barred from use of the system, the signalled account number is not found in the listing stored by the unit 14, and a signal to this effect is in these circumstances supplied from the comparator 20 to the gating unit 19 to cause the signal from the unit 18 to be passed on to the signal-enciphering unit 21.

The signal-enciphering unit 21 is responsive to the signal supplied through the gating unit 19 to supply to the modem 12 a signal signifying approval of the requested transaction, for transmission via the highway 11. This 'approval' signal is of a form that is determined within the unit 21 by a binary-coded cipher that is derived at the terminal by a cipher-generating unit 22 (FIG. 1) there. The cipher is generated in the unit 22 in response to the request for dispensing by the customer and is transmitted from the modem 8 via the highway 11 together with the customer's entered account number and personal-identification number and the number identifying the terminal involved. The cipher received by the modem 12 at the computer station is supplied to the signal-enciphering unit 21, and is there used in the generation of a multi-digit binary-coded signal. It is this latter signal that is supplied to the modem 12 for transmission as the 'approval' signal to the modem 8 of the identified terminal.

The 'approval' signal received by the modem 8 is, as shown in FIG. 1, supplied to a recognition unit 23 coupled to a signal-enciphering unit 24. The unit 24 is operative to generate the same signal as generated by the unit 21, using the same cipher as generated by the unit 22 and transmitted to the computer station. The recognition unit 23 acts to detect the correspondence between the 'approval' signal received from the computer station and the signal generated by the unit 24, and only when such correspondence exists, acts to cause a 'dispense' signal to be passed via a gate 25 to a dispenser 26 of the terminal.

The dispenser 26 holds a reserve of packets of banknotes and is released to dispense one of these packets to the customer in response to the dispense signal supplied via the gate 25. Operation of the dispenser 26 in this way causes a signal to be transmitted the modem 8 to the computer station to signify that dispensing has taken place. This signal is utilized to clear the equipment at the computer station for the next operation and also to make an appropriate change in the use number stored against the customer in the storage unit 13. The same 'completion' signal is applied at the terminal to the printer 4 to confirm on the accounting record that a packet of money has been dispensed to the customer, and to clear the equipment at the terminal for the next transaction.

It has been assumed above that the customer's request for money is correctly made, and that there is no cause for his request not to be met by the system. In the event, however, that the personal-identification number entered by the customer does not have the appropriate correspondence with the entered account number, then this fact is detected by the comparator 17 which in this case, instead of supplying a signal to the gating unit 18, supplies to the modem 12 a signal signifying 'correspondence not detected', for transmission to the terminal. At the terminal this signal is supplied from the modem 8 to an indicator unit 27 that is exposed to the customer's view. In response to the correspondence-not-detected signal transmitted from the comparator 17, the indicator unit 37 exhibits the legend TRY AGAIN, inviting the customer to enter his personal-identification and account numbers again.

Signals derived at the computer station are transmitted to the modem 8 and thence to the indicator unit 27 in a similar way, in the event that although the entered personal-identification and account numbers have the necessary correspondence, the requested transaction would cause the customer's permissible maximum frequency of withdrawal to be exceeded, or the identified account is barred from use. In the first of these two cases the gating unit 18 supplies to the modem 12 a signal signifying 'excess use', and this as transmitted to the indicator unit 27 causes the legend INVALID TODAY to be exhibited to the customer. On the other hand, where the customer's account is identified by the comparator 20 as being barred, the signal signifying 'barred account' used in these circumstances to inhibit operation of the gating unit 19, is supplied to the modem 12 and at the indicator unit 27 causes the legend INVALID NUMBER to be exhibited.

Any of the signals signifying correspondence-not-detected, excess-use and barred-account received at the terminal are supplied to the printer 4 and to an interlock unit 28 as well as to the indicator unit 27. The unit 28 is responsive to any one of these signals to inhibit passage of the dispense signal through the gate 25 to the dispenser 26 so that no dispensing can take place when any of the circumstances signified by these signals exists. The supply of the signals to the printer 4 ensures that the accounting record provided on the paper tape 5 is appropriately annotated with information concerning the reason for non-completion of the transaction requested.

The tape 5 imprinted with the customer's account number and the other information concerning completion or otherwise of the transaction, provides within the terminal the record necessary for accounting and checking purposes. The account number plays an essential role in the operation of the system to dispense a packet of money, and the fact that this number as used to control the dispensing operation is read from the imprinted tape 5, rather than being taken directly from the signals entered into the system via the push-buttons 1, is of substantial advantage. In particular it ensures that the dispensing operation is conditional upon there being an accurate and legible record of this number.

The security of the system is dependent on the secrecy of the personal-identification number. Since the highway 11 cannot normally be regarded as completely protected from persons of fraudulent intent it is clear that the signals transmitted between the terminal and the central computer-station are not to be such as to reveal the personal-identification number appropriate to any particular customer or account number. It is the function of the enciphering unit 7 to provide an encoding of the entered personal-identification numbers that avoids this possibility. This same encoding of the personal-identification numbers provided by the unit 17 is embodied in the system of check numbers that are stored in the memory of storage unit 13. Here again then, the personal-identification number is associated with the account number in enciphered form only, so that the precise combination of personal-identification number and account number that must be entered into the system manually through the push-buttons 1 in order to obtain money, is not revealed.

The construction of an enciphering unit suitable for use as the unit 7 is illustrated in FIG. 3 and will now be described.

Referring to FIG. 3, the four-digit binary-coded decimal signals representative of the number to be enciphered are supplied via a lead 50 to a register 51. The values of the decimal digits of the number are signalled in turn from the register 51 to an adder 52 as successive four-digit binary numbers. Each of these four-bit numbers is added at the adder 52 to another four-bit number that is conveyed to the adder 52 from a gate unit 55. The four-bit sum derived by the adder 52 in respect of each addition is stored in a four-stage shift register 54 that is controlled by a clocking unit 55. The unit 55 provides a train of four clock pulses in response to the reading out from the register 51 of each decimal digit in turn, and this train serves to transfer the four-bit sum stored in stages I to IV of the register 54, bit by bit into a shift-register 56 having 25 stages I to XXV.

The initial setting of the shift register 56 is determined by an entry-program unit 57. The unit 57 clears the register 56 at the beginning of each enciphering operation, and then enters into it a secret binary number of 25 digits. This secret number is determined solely by jumpering, that is to say by a pattern of cross-connections, effected by one or more printed-circuit boards (not shown) plugged into the unit 57.

Signals in accordance with the bits stored at any time in the 25 stages I to XXV of the register 56 are applied to a feed-through program unit 58. The unit 58 jumbles up the order of the signals derived from stages I to XXIV and regroups them as representations of six four-bit numbers. These numbers are conveyed in pairs to three adders 59 to 61. This scrambled assembly of the pairs of numbers from the bits stored in the 24 stages I to XXIV of the register 56 is determined by cross-connections that are effected by one or more plug-in printed-circuit boards (not shown) in the unit 58. The cross-connections effected include a connection from stage XXV of the register 56 to convey the bit stored in that stage as a carry-forward input to the adder 59.

The adders 59 to 61 are interconnected to provide a carry-forward from the adder 59 to the adder 60 and from the adder 60 to the adder 61, and the three four-bit sums derived by them are used in the formation of a four-bit number that is fed back through the gate unit 53. The four bits of this number are formed by the least- and most-significant bits of the sum provided by the adder 59 and by the most-significant bits of the sums provided by the adders 60 and 61. The gate unit 53 passes the number formed in this way on to the adder 52 as each individual decimal digit is read out from the register 51. Thus the four-bit numbers conveyed in turn into the register 56 from the adder 52 in response to the successive decimal digits stored in the register 51, are dependent not only on the values of these individual decimal digits but also on the four-bit numbers formed in turn from the outputs of the adders 59 to 61. The state of the shift register 56 after the last decimal digit has been read out of the register 51, has in consequence a complex and unique relationship to the number in the register 51, that is dependent both on the number entered initially from the entry-program unit 57 and the feed-through program set up in the unit 58. It is not until the last decimal digit of the number in the register 51 has been read out and the shift register 56 has settled, that generation of the enciphered-number digits takes place.

Generation of each enciphered-number digit is brought about by the supply from the clocking unit 55 of a train of four clock pulses to transfer the content of the register 54 into the register 56. The content of the register 54 is in each case the four-bit sum of the four-bit number stored in stages XXII to XXV of the register 56 and the four-bit number formed from the outputs of the adders 59 to 61. These two numbers are added together at the gate unit 53 and the relevant sum is in each case fed through to the register 54 ready for the next train of four clock pulses from the clocking unit 55 (it is only at this time, when there is no output from the register 51, that the four bits stored in stages XXII to XXV are involved in the feedback). The state of the register 56 accordingly changes throughout the generation sequence, producing a new four-bit number at the output of the adders 59 to 61 as each new digit is entered. This four-bit number, as well as being fed back via the gate 53, is written into a buffer-store unit 62.

The four-bit number formed from the outputs of the adders 59 to 61 is to base 16 and before being conveyed to the unit 62 is submitted to a conversion process that restricts it to base 10. This process is performed by a gate unit 63 that is operable to change the value of the most-significant bit before this is conveyed from the adder 61 to the unit 62. The gate unit 63 makes the change only in circumstances in which the value of the most-significant bit is "1", and then only if the value of either of the second-and third-significant bits supplied by the adders 60 and 59 respectively, is 1 also; it is only in the circumstances in which one or both of the second- and third-significant bits has the value 1, that the binary number can exceed nine, and then only if the value of the most-significant bit is 1.

Generation of successive four-bit numbers to base ten proceeds until the complete enciphered decimal-number is assembled in the buffer-store unit 62. The complete number is read out from the unit 62 in binary-coded decimal form and serially via a lead 64. The relationship between this enciphered number and the number entered in the register 51 initially, can be readily changed by changing the cross-connections made within either or both of the units 57 and 58. In the case of the enciphering unit 7 such a change necessarily implies a reallocation of the personal-identification numbers, or of the check numbers, in order to maintain the appropriate correspondence with the account numbers, but it will in general be sufficient to establish a new, independently-secure numbering system.

The same construction of enciphering unit as shown in FIG. 3 may be used for both the central-station and terminal signal-enciphering units 21 and 24. The same number, in the form of the cipher generated by the unit 22, is entered (via the lead 50) into both, and the same cross-connections (in the units 57 and 58) are provided in them, so that they derive from the cipher (to supply via the lead 64) the same enciphered number as one another. The cipher-generating unit 22 is in essence a random-number generator such that a new cipher unrelated to any preceding cipher, is generated upon each new customer operation of the system. Thus the 'approval' signal as generated by the enciphering unit 21 changes from one transaction to another and can result in dispensing only if it is derived from the same cipher as used in the enciphering unit 24 of the terminal. This avoids the possibility that the dispensing operation can be brought about fraudulently by injection into the highway 11 of a reproduction (for example from a recording) of the approval signal used in an earlier, authentic transaction.

As a further precautionary measure, it may be arranged that the number entered into the shift register 56 through the entry-program unit 57 in both signal-enciphering units 21 and 24 is dependent on the customer's account number entered into the system via the push-buttons 1. In this way it is possible to protect against the possibility that a false pair of account and enciphered personal-identification numbers is substituted in the highway 11, or at the modem 12, for the pair that would otherwise be transmitted to the computer station. Any approval signal generated by the signal-enciphering unit 21 in these circumstances would be dependent on the substitute account number, whereas the signal compared with it in the recognition unit 23 and generated by the signal-enciphering unit 24, would be dependent on the substituted account number; no recognition of the approval signal would therefore take place and so the fraudulent attempt at obtaining operation of the dispenser 26 would be unsuccessful. With this arrangement it may be found to be of advantage to convey the account number to the signal-enciphering unit 24 directly from the unit 3 (as indicated in broken line in FIG. 1) rather than as read out by the reader 9. The account number as read out by the reader 9 and conveyed to the computer station is however applied (as indicated in broken line in FIG. 2) to the signal-enciphering unit 21. Recognition of the generated approval signal, with consequent dispensing, is accordingly in these circumstances conditional also upon there being agreement between the number entered and the readout of it from the accounting record provided on the tape 5.

With the system described above only one packet of money is dispensed in response to each request. The system may however be readily adapted to provide for choice by the customer of the amount of money that is to be dispensed to him. Selection in this respect may be related to extra operation of the push-buttons 1 by the customer or by operation of further manually-operable buttons or selectors. The additional information entered may be transmitted through to the computer station for checking against the use number, and used for appropriate annotation of the account record on the tape 5. Where a plurality of packets are to be dispensed this may be effected by repeated generation of the dispense signal.

Provision may be made to detect the circumstances in which repeated or systematic attempts are made to obtain dispenser operation fraudulently. In general three successive attempts at obtaining operation using the same account or personal-identification number, will be allowed by the system. The function of control in these respects may be readily achieved using conventional techniques, at the computer station.

The construction of the computer station may be simplified where a large number of customers are to be permitted to use the system. In this case the need to store the check number appropriate to each account number may be avoided by providing that there is a predetermined unique translation from one to the other. It is clearly necessary for security that the translation shall not be such that it can be deduced from comparison of the two numbers or by analysis of the relationships existing between several authentic pairings. To this end the translation may be conveniently based on the enciphering operation of the form already described in relation to the unit 7. For example, the computer station may include a unit of the form shown in FIG. 3 that is arranged to translate the account number as received from the modem 12 into a number that is used (instead of the check number stored in the storage unit 13) for comparison in the comparator 17 with the enciphered personal-identification number. Alternatively, the enciphered personal-identification number could be translated and then in this form used for checking against the signalled account number. All need for the storage unit 13 can, in either case, then be avoided if instead of storing a use number in respect of each customer, provision is made for storing the account numbers of only those customers who have made use of the system. The listing of account numbers accumulated in this respect during any period gives a means of determining in respect of each customer the extent of his use of the system, and this can be utilized in a manner comparable with the listing of barred account-numbers stored by the unit 14, in control of the dispensing function.

It is possible with the modifications of the computer staton described above, and also with the basic form shown in FIG. 2, to arrange that the same personal-identification number is associated with two or more accounts. However, this is preferably avoided in practice unless the accounts involved have some special relationship to one another, or the number of customers permitted to use the system is very large.

I claim:
1. Equipment for use in the control of authorization of an operation requested by a person comprising: a plurality of manually-operable devices that are operable to enter a word into the equipment, the particular word entered being dependent on which, and in what sequence, the manually-operable devices are operated; means to derive signals in accordance with two different words entered respectively by successive sequences of operation of said manually-operable devices; comparison means for effecting a comparison between the two different words to detect whether a predetermined correspondence exists between them, said comparison means comprising a signal comparator, a store for storing a multiplicity of words at a multiplicity of addresses respectively, means for reading out a stored word from an address of the store dependent on one of the two entered words, means for supplying signals in accordance with the other entered word to the signal comparator, and means for supplying signals in accordance with the word read out from the store to the signal comparator for comparison with the signals supplied thereto in respect of the said other of the two entered words; and means for signifying authorization of said operation in dependence upon the detected existence of said predetermined correspondence.

2. A method of controlling machine-authorization of a credit-account transaction requested by a customer comprising the steps of:

a. entering the customer's credit-account identification into the machine through manually-operable means, the credit-account identification entered being dependent on the manual operation effected to the manually-operable means;

b. entering into the machine a customer-dependent code through the said manually-operable means, the code entered being different from the credit-account identification and also being dependent on the manual operation effected to the manually-operable means;

c. comparing the credit-account identification and the entered code with one another to detect whether a predetermined correspondence exists between them;

d. signifying authorization of said credit transaction only upon the existence of said predetermined correspondence; and e. recording the account identification of the customer for later billing.

3. A method according to claim 2 including the steps of checking the extent of previous use of the credit account by the customer, and inhibiting the signalling of authorization of said credit transaction in the event that a predetermined maximum use of the credit account would otherwise be exceeded.

* * * * *